(No Model.)
N. J. HOUK.
Vehicle Wheel Hub.
No. 233,781. Patented March 15, 1881.
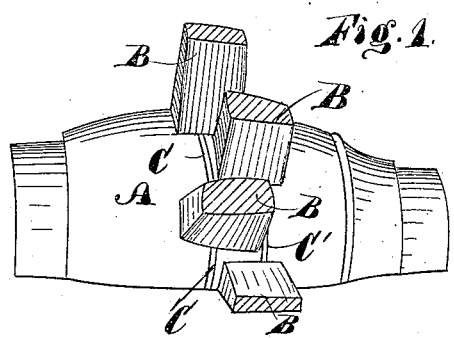
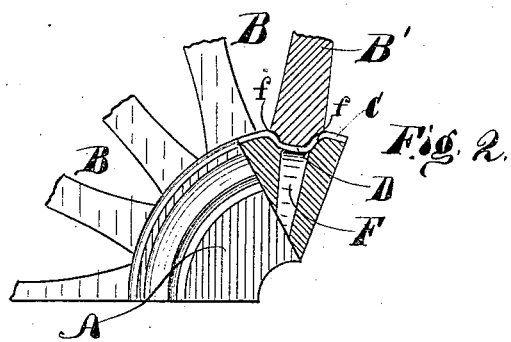
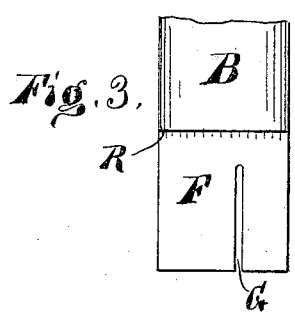
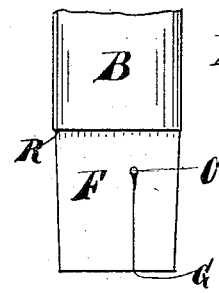
Witnesses:
G. H. Bennett.
J. J. Wheat.
Inventor.
Newton J. Houk
Rev. E. Frink
his attorney

UNITED STATES PATENT OFFICE.

NEWTON J. HOUK, OF INDIANAPOLIS, INDIANA.

VEHICLE-WHEEL HUB.

SPECIFICATION forming part of Letters Patent No. 238,781, dated March 15, 1881.

Application filed September 10, 1880. (No model.)

*To all whom it may concern:*

Be it known that I, NEWTON J. HOUK, a citizen of the United States, residing at Indianapolis, in the county of Marion and State of Indiana, have invented a new and useful Improvement in Draw-Bands for Wheel-Hubs, of which the following is a specification.

My invention relates to draw-bands for hubs; and the objects of my invention are, first, to secure the spokes of a wheel in a hub, and at the same time form a draw-band for the hub, to prevent it from splitting while the spokes are being driven; second, to prevent moisture from splitting the hub after the spokes are driven home. These objects I accomplish by the mechanism illustrated in the accompanying drawings, in which—

Figure 1 represents a perspective view of a portion of a hub and spokes, showing the draw-bands in their proper places after the spokes are driven into the hub. Fig. 2 is an end view of the hub, partially cut away to show the manner in which the draw-bands are forced inward and bind the hub when the spokes are driven. Fig. 3 is a side view of the tenon end of a spoke, showing the slot cut therein to straddle the draw-band before the spoke is driven into the hub; and Fig. 4 represents the tenon end of the spoke with the slot closed, thus clamping the draw-band after the spoke is driven into the hub.

Similar letters refer to like parts throughout the several views.

A represents any ordinary hub, and B the spokes. The hub A has two grooves turned in its periphery to receive the draw-bands C C'. The spokes B have their hub-tenons provided with slits G, to permit the spokes to be inserted in their respective mortises over the draw-bands, and the slits G extend part way up the tenon toward the shoulder R, thus providing a stop to draw the wire bands into the hubs when driven home, as shown in Fig. 2.

The draw-bands C C' are made of wire and bent around the hub A in their respective grooves. The ends of each band are then twisted together over one of the mortises in the hub A. The first spoke is inserted in its mortise, with the slit G straddling the twisted joint of the band and driven home, after which the balance of the spokes are driven home in their respective mortises, and as the upper end of the slit G in each spoke reaches the draw-band it forces the wire down into the mortise, as shown in Fig. 2. At the same time the draw or taper given to the mortise closes the slit G, so as to hold the wire fast, as shown in Fig. 4, thus tightening the draw-bands C C' around the hub, and securing the spokes in the hub, and leaving the hub in a good smooth condition for finishing.

What I claim as new, and desire to secure by Letters Patent, is—

1. The draw-bands C C', let into grooves formed in the hub, combined with the spokes B, provided with slits G, substantially as described, for the purpose specified.

2. The spokes B, provided with slits G, which extend upward to a point a short distance below the shoulders R, combined with the hub A, having beveled mortises and grooves turned therein to receive the wire draw-bands, and the draw-bands C, as and for the purpose specified.

3. The draw-bands C, passing through each spoke-tenon and hub A, whereby the draw-band is drawn tightly around the hub and embedded in the tenon and mortise, substantially as shown and described.

In testimony whereof I have signed my name to this specification in the presence of two subscribing witnesses.

NEWTON J. HOUK.

Witnesses:
E. O. FRINK,
GEORGE H. RENNETT.